(12) United States Patent
Schmidt et al.

(10) Patent No.: US 11,032,604 B2
(45) Date of Patent: Jun. 8, 2021

(54) MANAGEMENT OF DEVICES IN AD HOC RENDERING NETWORKS

(71) Applicant: Apple Inc., Cupertino, CA (US)

(72) Inventors: Johannes Schmidt, Cupertino, CA (US); Kevin Shen, Cupertino, CA (US); David Saracino, San Francisco, CA (US); Simon Goldrei, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/539,510

(22) Filed: Aug. 13, 2019

(65) Prior Publication Data
US 2020/0077133 A1    Mar. 5, 2020

Related U.S. Application Data

(60) Provisional application No. 62/725,709, filed on Aug. 31, 2018.

(51) Int. Cl.
*H04N 21/43* (2011.01)
*H04N 21/436* (2011.01)

(52) U.S. Cl.
CPC ....... *H04N 21/4307* (2013.01); *H04N 21/436* (2013.01)

(58) Field of Classification Search
CPC .................................................. H04N 21/4307
See application file for complete search history.

(56) References Cited

U.S. PATENT DOCUMENTS

| | | | |
|---|---|---|---|
| 2012/0263318 A1* | 10/2012 | Millington | H03G 3/3026 381/107 |
| 2016/0055879 A1 | 2/2016 | Arai et al. | |
| 2017/0063956 A1* | 3/2017 | Rajapakse | H04L 65/1086 |
| 2019/0149429 A1 | 5/2019 | Stocker | |

FOREIGN PATENT DOCUMENTS

WO    WO 2011/109416 A2    9/2011

\* cited by examiner

*Primary Examiner* — Girumsew Wendmagegn
(74) *Attorney, Agent, or Firm* — BakerHostetler

(57) ABSTRACT

Control techniques are disclosed for devices that are members of ad hoc rendering networks. A first network device may receive a data record representing state of the network. The data record may contain data identifying device(s) that are members of the network, any grouping(s) of the device(s) defined for the network, and a play state of the device(s). When the first network device receives the data record, it may store the data record locally at the first player device. The first player device may determine whether the data record possesses a command altering a play state of a device. If so and if the command is addressed to the first player device, the first player device may execute the command at the first player device. The data record may be relayed among all devices in the ad hoc rendering network, and each device may perform this same process. In this manner, state updates propagate to all devices that are members of the rendering network, and all such devices store state data of all other devices.

37 Claims, 4 Drawing Sheets

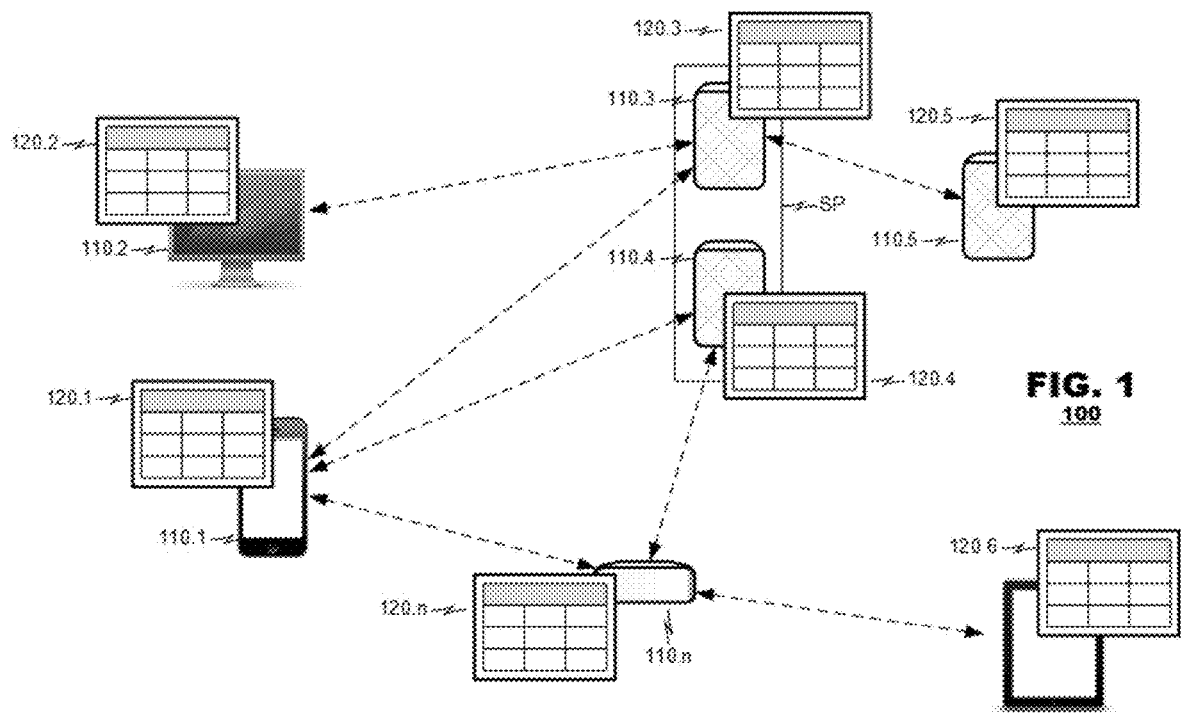
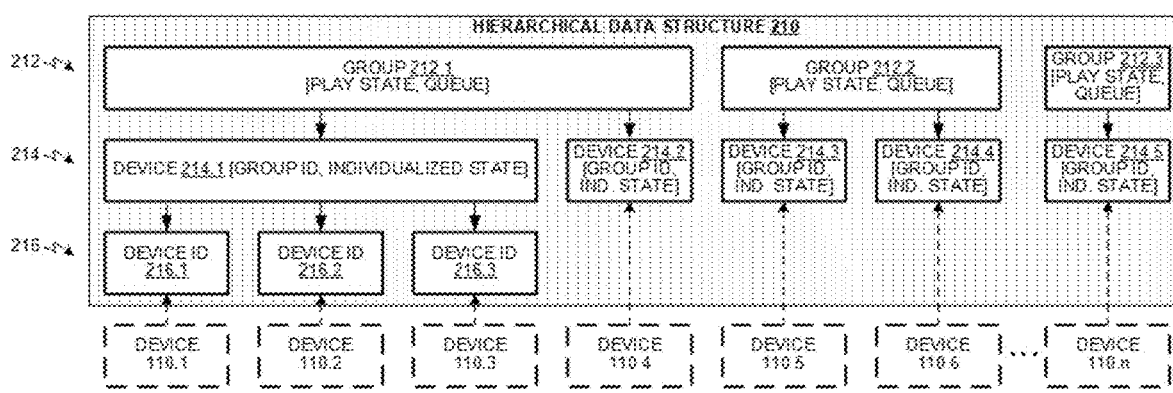
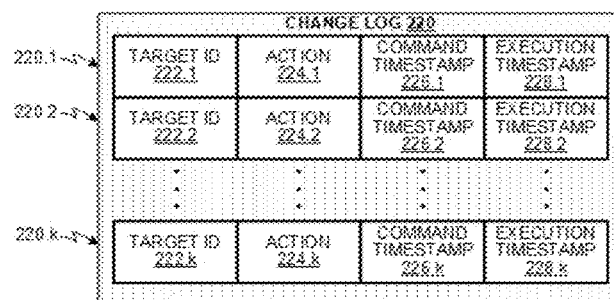
FIG. 1
100
FIG. 2
200

300

400

500

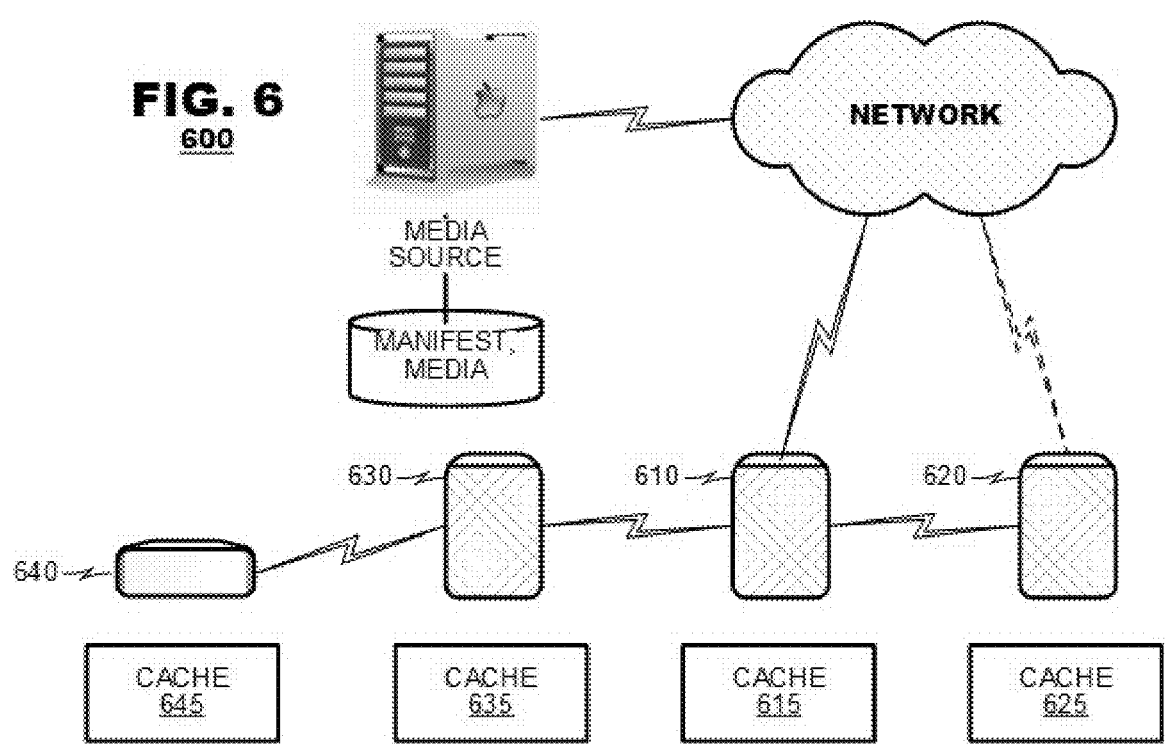

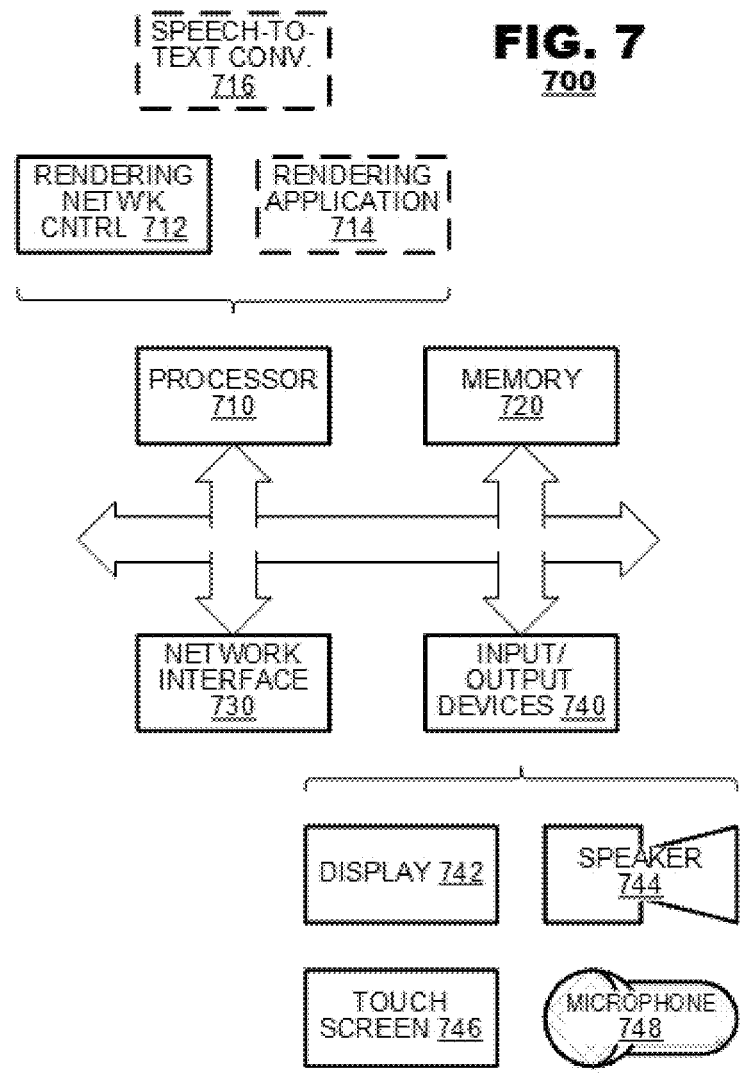

MANAGEMENT OF DEVICES IN AD HOC RENDERING NETWORKS

CROSS REFERENCE TO RELATED APPLICATION

This application claims the benefit of U.S. Provisional Application No. 62/725,709 filed on Aug. 31, 2018, the disclosure of which is incorporated by reference herein.

BACKGROUND

The present disclosure relates to formation and management of ad hoc networks of playback devices in media rendering applications.

A variety of modern consumer electronic devices have been developed for rendering of digital media assets. High definition televisions and smart speaker devices perhaps are the most intuitive examples, and they provide opportunities to render media assets from a variety of sources. Consumers no longer are required to purchase individual media devices such as optical discs on which the media asset it encoded. Instead, it has become common for the devices to download media assets from online sources such as the Internet and render them.

It remains a challenge to manage playback and rendering events in a synchronized manner. While a consumer finds it fairly simple to download an audio/visual asset for display on a single device, it becomes much more challenging to render a video component on a first device, and render separate audio elements of the asset (say, left and right channels of audio) on other devices.

BRIEF DESCRIPTION OF THE DRAWINGS

FIG. 1 is a block diagram of a system 100 according to an aspect of the present disclosure.

FIG. 2 illustrates a data structure according to an aspect of the present disclosure.

FIG. 6 illustrates an exemplary network application according to an aspect of the present disclosure.

FIG. 7 is a block diagram of a rendering device according to an aspect of the present disclosure.

DETAILED DESCRIPTION

Figure 3:
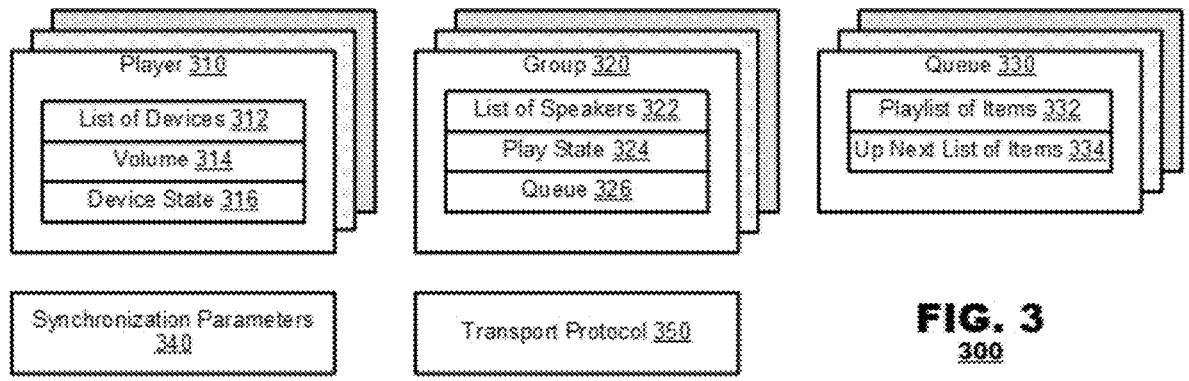
FIG. 3 illustrates a data record according to an aspect of the present disclosure.

Aspects of the present invention provide control techniques for devices that are members of ad hoc rendering networks. A first network device may receive a data record representing state of the network. The data record may contain data identifying device(s) that are members of the network, any grouping(s) of the device(s) defined for the network, and a play state of the device(s). When the first network device receives the data record, it may store the data record locally at the first player device. The first player device may determine whether the data record possesses a command altering a play state of a device. If so and if the command is addressed to the first player device, the first player device may execute the command at the first player device. The data record may be relayed among all devices in the ad hoc rendering network, and each device may perform this same process. In this manner, state updates propagate to all devices that are members of the rendering network, and all such devices store state data of all other devices.

FIG. 1 is a block diagram of an exemplary network system 100 in which aspects of the present disclosure find application. FIG. 1 illustrates a set of devices 110.1-110.n that are members of a common rendering network 100. Typically, each device 110.1, 110.2, . . . , 110.n will communicate only with a sub-set of other devices in the system; it may be rare event that all devices 110.1, 110.2, . . . , 110.n communicate with all other devices 110.1-110.n. The principles of the present disclosure find application with a variety of media playback and control devices, including audio speakers 110.3, 110.4, 110.5, video displays 110.2, media console devices 110.n (such as set top boxes or Apple TV devices), smartphones 110.1 and/or personal or tablet computers 110.6. Moreover, individual devices may join and/or disconnect from time to time as connectivity between devices fluctuates.

In an aspect, the devices 110.1, 110.2, . . . , 110.n in a common network 100 may exchange a data record 120.1, 120.2, . . . , 120.n identifying operational state of the devices 110.1, 110.2, . . . , 110.n. In an ideal case, each device's copy of state data record would be identical to every other devices' copy of the state data record. When a first device (say, device 110.1) in the network receives a user command that changes operational state of device(s) in the rendering network (e.g., either the first device 110.1 itself and/or other device(s) on the network 100 (say, device 110.5)), the first device 110.1 changes the state data record and communicates it to the other device(s) to which it has communication access (here, devices 110.3, 110.4, 110.n). The other devices 110.3, 110.4, 100.n relay the changed state data record to other devices in the network 100 until all devices 110.2, . . . , 110.n have received the changed state data record. Over time, given sufficient network connectivity, each device's copy of the state data record will converge until they are identical.

Each device that receives the changed state data record may store it locally and determine whether it is the subject of the changed state. Thus, in the example of FIG. 1, if a command were entered a device 110.1 that is directed only to device 110.5, devices 110.3, 110.4, 110.n each would receive a copy of the changed state data record and they would store it locally. Each of the devices 110.3, 110.4, 110.n would transmit the changed state data record to the other devices with which it communicates. Moreover, each of the devices 110.3, 110.4, 110.n would determine whether it is the subject of the changed state data record. In the case of a command directed to device 110.5, each of the devices 110.3, 110.4, 110.n would determine that it need take no action in response to the changed state data record. State changes may cause operational changes at a single device or at multiple devices as determined by an input command.

Continuing with this example, when device 110.5 receives the changed state data record, device 110.5 would determine that it is the subject of the changed state data record. It would store the changed state data record locally, and retransmit it to other device(s), if any, to propagate the changed state data record further throughout the network 100. The device 110.5 also would change its operational state represented by the changed state data record because it is the subject of the command represented by the changed state data record. As described below, when a device (say 110.5) changes its operational state, the change may induce a further change to the data record, which may be propagated to the other device(s) 110.1-110.4, 110.6-110.n of the rendering network using the techniques described above.

As described, user commands may cause changes to operational state of an ad hoc network of rendering devices. Other stimuli also may cause changes to operational state of the network, such as events that are triggered by time ("alarmed" events) or events that are triggered by external input (motion-sensor triggered events, events triggered by ambient noise about a rendering device, etc.). Triggering events may cause operational changes in a single device or multiple devices as may be desired. The principles of the present disclosure find application with such events, as well.

The principles of the present disclosure support applications in which select devices within the network 100 are grouped dynamically for playback events. In the example of FIG. 1, for example, speaker device 110.3, 110.4 are shown grouped together as a stereo pair SP. Other dynamic grouping operations are permissible. For example, a set of speakers may be grouped together, with each assigned to render individual channels of a multi-channel audio stream (e.g., front left, front right, center, rear left, rear right, subwoofer). Alternatively, a video display, one or more audio speakers, and a tablet computer may be grouped together to render a common audio/visual media asset with the table computer rendering secondary metadata of the asset. Thus, a wide variety of device groupings find application with the present disclosure. In an aspect, the state data record may store information representing group(s) within the network.

FIG. 1 illustrates only exemplary communication connections that may exist between devices 110.1, 110.2, . . . , 110.n that are members of the rendering network 100. In an embodiment, the devices 110.1, 110.2, . . . , 110.n may one or more connections to local or large area networks, which may provide communication with media source devices, such as Internet media sources and/or streaming sources. Such connections are not illustrated in FIG. 1 for simplicity.

In one aspect, network devices may exchange a state data record 200 that illustrates groupings among devices according to group hierarchy. An exemplary hierarchical data structure 210 is illustrated in FIG. 2. Here, the hierarchical data structure 210 is shown as having up to three levels: a group level 212, a device level 214 and, as needed, a sub-device level 216. In an aspect, all devices within a given network 100 (FIG. 1), will be represented in a hierarchical data structure 210. In circumstances where a device (say device 110.n) is not grouped with any other device(s) for playback, they may be represented in the hierarchical data structure 210 as constituting its own group (group 212.3, in this example). In implementation, one or more of the levels may be omitted as may be appropriate for individual applications.

The group level 212 of the hierarchical data structure 210 may contain data that is common to all members of the group. In the example illustrated in FIG. 2, three groups are shown 212.1, 212.2, and 212.3.

For each group element 212.1, 212.2, 212.3 in the hierarchical data structure 210, the data structure 210 may represent information such as the group's play state, and data describing a playback queue for the respective group. The play state of a group may identify, for example, whether devices in the group are playing, paused, or stopped, and when the state is playing, the state may identify a playback rate (which may accommodate fast-forward and/or fast-reverse playback modes). The queue data may identify media asset(s) that are to currently assigned to the group for playback, for example, an identified list of media assets (which may include a single entry or multiple entries), or a media stream (which may accommodate media channels delivered by a network).

For each "device" element 214.1-214.5 in the hierarchical data structure 210, the data structure 210 may represent information such as the device's group ID, the group to which the device is a member, and state variables that are unique to the device (such as the device's volume).

For each "sub-device" element 216.1-216.3 in the hierarchical data structure 210, the data structure 210 may represent information regarding the device's role within a paired set of devices. For example, speaker devices 110.3, 110.4 (FIG. 1) may be grouped together logically as a single "device" (e.g., a stereo pair); in such a use case, sub-device elements 216.1-216.3 may be provided to represent each device's role (e.g., left speaker, right speaker, center speaker, etc.). In such a use case, parameters common to the grouped devices (e.g., volume) may be represented at the device level 214 and parameters unique to the grouped devices (e.g., channel, individualized volume corrections) may be represented at the sub-device level.

In an aspect, the device and sub-device layers 214, 216 may be merged into a single hierarchical level, if deemed convenient.

FIG. 2 also identifies a change log 220. The change log may store data representing user commands and commands from other input(s) that govern playback state of device(s) in a rendering network. Each entry 220.1, 220.2, . . . 220.k in the change log 220 may store data identifying a target ID 222.1 representing an element that is a target of the input command, which may be expressed at the group, device or sub-device level; an action 224.1 representing the action to be taken on the target element, a command timestamp 226.1 representing a time at which the input command first was received by a device of the rendering network, and an execution timestamp 228.1 representing a time when the action is to be executed by target device(s). For input commands that address devices at a group level, the execution timestamp field 228.1 may have sub-fields (not shown) for each member of the group. Rendering devices may change their operational state at a time that is synchronized to the execution timestamp 228.1 to provide synchronous execution of the playback change.

As discussed, input commands may be received by any device in a rendering network and they may identify other device(s) in the rendering network as targets of the command. When an input command is received at a device, the receiving device may create a new entry (say, 220.k) in the change log 220, identifying the target ID 222.k, the action 224.k, the command timestamp 226.k, and the execution timestamp 228.k. If the receiving device also is a target of the new command, the receiving device may execute the command at a time identified by the execution timestamp 228.k. The receiving device may transmit the revised data record 200 to other device(s) in the rendering network, as discussed above in connection with FIG. 1.

The revised data record 200 may propagate through the rendering network 100 (FIG. 1). As discussed, each device 110.1-110.n that receives the data record 200 will review the data record 200 to determine if the change log 200 identifies a new command and, if so, each device will determine whether it is a target of the new command. Each device will execute the command if it is a target of the command at a time identified by the execution timestamp 228k. Eventually, the revised data record 200 will be revised by the all the target devices (if necessary), and a final version of the data record will be received and stored by all devices in the rendering network.

As discussed above, the execution timestamps 228.1-228.k may provide timing references for the rendering devices 110.1-110.*n* to change their operational state. It is possible, owing to communication latencies between devices, that a given rendering device (say, 110.6) will receive notification of a state change after the time identified in an execution timestamp 228.*k* corresponding to the change. In such an event, the rendering device 110.6 may compute an offset between a present time and the time identified in the execution timestamp 228.*k*, which becomes an offset for executing the playback change. In this manner, the computed offset provides a timing mechanism for the rendering device to "catch up" and render media in a manner that is synchronized with any other device(s) to which it is grouped.

State data records need not be hierarchical, however. FIG. 3 illustrates a state data record 300 according to another aspect of the present disclosure. There, the state data record 300 contains data elements for players 310 in the rendering network, groups 320 in the rendering network, and queues 330 active in the rendering network.

The state data record 300 may contain separate player 310 elements for each logical player in the rendering network. Each player element 310 may store data representing a list of devices that correspond to the player, which may be standalone devices 110.1-110.2, 110.5-110.*n* or, when devices are logically grouped as a single player (e.g., stereophonically paired devices). The player element 310 also may store data representing a player state 314 (such as volume) and device state 316 (such as types and quality of network connectivity).

The group element 320 may store data representing a list of player devices 322 that are members of the group, a play state 324 of the group and a queue 326 to which the group belongs.

The queue element 330 may store data representing a playlist of media assets that are to be played. For example, the queue element 330 may store data identifying a playlist of items 332, either by listing media assets that belong to the playlist or as a reference to resource provided by a media source that identifies the asset (e.g., a URL to a media channel). The queue element also may include data 334 representing a next item to be played in the playlist.

The state data record 300 may store other data representing operation of the rendering network. For example, the state data record may identify synchronization parameters 340 that define techniques for synchronizing data among devices in the rendering network. For example, the synchronization parameters element 340 may contain data identifying connectivity among the network devices 110.1-110.*n* (FIG. 1). The synchronization parameters element 340 also may identify technique(s) that will be used to propagate data records throughout the network, whether it is by a tree propagation model, conflict-free replicated data type (CRDT) synchronization techniques, one way HTTP relay techniques, or another technique. The state data record 300 also may store identifiers of a transport protocol 350 at work among devices of the rendering network.

It may occur that separate user commands are entered at separate devices within a common rendering network in overlapping manner and perhaps in a short enough span of time that a first changed data record has not propagated entirely throughout the network 100 (FIG. 1) when a second command is entered. In an aspect, different user commands are assigned timestamps representing the times at which they were entered at the respective devices. As the data records generated from these new commands propagate through the network, content of the data records may be merged. When individual devices inspect the data records and determine whether the new commands affect playback at their location, the devices may implement the command with the most recent timestamp. In this manner, conflicts between two incompatible commands may be resolved in favor of the newest command to be entered. In other aspects, incompatible commands may be resolved by other techniques, for example, favoring commands based on the identities of the persons that entered the command, based on types of the devices at which the commands were entered (e.g., smartphone or remote control has precedence over speaker), or based on other priority schemes. In any case, conflicts between commands may be resolved in a uniform manner so that all devices obtain a common result.

Figure 4:
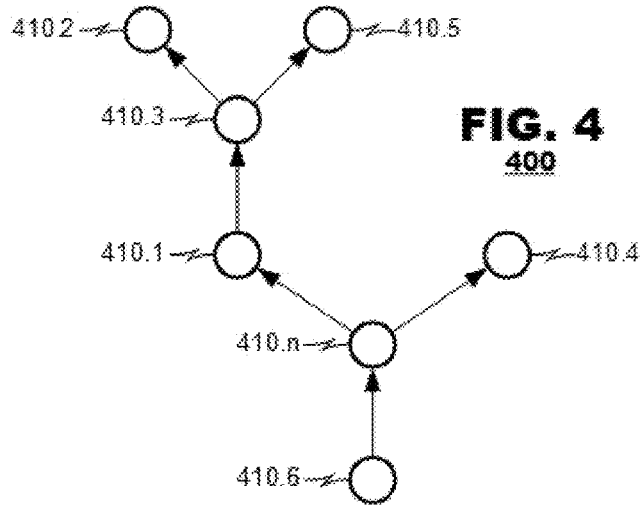
FIGS. 4 and 5 illustrate tree models according to aspects of the present disclosure.
Figure 5:
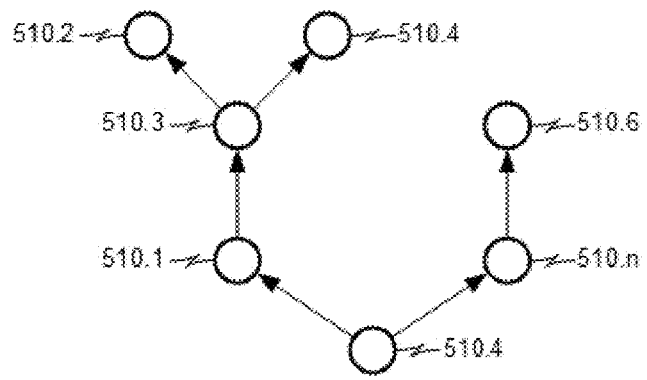

FIGS. 4 and 5 figuratively illustrate operation of a tree propagation model according to an aspect of the present disclosure. In a tree propagation model, each member of a rendering network (say, device 110.1 in FIG. 1) may store data defining a set of propagation trees showing network connections to be used to propagate data record updates to neighbor devices. Each device may identify a device that is the originator of a data record update and may identify its own role (if any) in propagating updates throughout the network. FIGS. 4 and 5 illustrate two tree models 400, 500 traversing the communication connections illustrated in FIG. 1. The model 400 of FIG. 4 may be employed when device 110.6 (node 410.4) is the originator of a data record update. The tree 400 illustrates that node 410.*n* (device 110.*n*) receives the update from node 410.6, and nodes 410.1 and 410.4 (devices 110.1, 110.4) receive the update from node 410.*n*. Node 410.1 may relay the updated data record to node 410.3 (device 110.3), and node 410.3 may relay the updated data record to nodes 410.2 and 410.5.

FIG. 5 illustrates a different tree model 500 that may be employed when device 110.4 (node 510.4) is the originator of a data record update. The tree 500 illustrates that nodes 510.1 and 510.*n* (devices 110.1 and 110.*n*) each receive the update from node 510.4. Node 510.1 relay the data record update to node 510.3 (device 110.3), and node 510.3 relays the update to nodes 510.2 and 510.4 (devices 110.2, 110.4). In this example, node 510.*n* relays the update to node 510.6 (device 110.6). Thus, the different trees may be employed based on which device is the originator of a data record update.

In an embodiment, the devices to a rendering network (FIG. 1) may store the tree models in the data record itself. In another embodiment, each device may derive the trees from a common derivation protocol from network connectivity information stored in the data record. In this latter aspect, the derivation protocol may be the same at each device to ensure that a common set of trees are developed at each device.

Although it is expected that many rendering devices will possess independent connectivity to online media sources through Internet connections, aspects of the present disclosure provide device-to-device support when select devices do not possess such connectivity. FIG. 6 illustrates an exemplary network application in which a first device 610 (shown as a smart speaker) possesses a network connection to a media source but other devices 620-640 do not. In the illustrated example, devices 620 and 630 each are shown as placed in direct communication with device 610, and device 640 is provided in communication with device 630.

In an aspect, smart devices may act as relays of networking communication for discovery and retrieval of media and as media caches on behalf of other devices. Thus, devices 620-640 that does not possess direct network to the Internet may direct their requests to neighboring device(s). When a device 610 that possesses direct network connectivity receives such a request, the device 610 may download such a media item on behalf of the requesting device.

In many media delivery systems, a given media asset (e.g., an audio asset, an audio/visual asset, etc.) are stored at a media source as a manifest file and a plurality of media segments. The manifest file typically stores data describing each of the asset streams that are available for the streams. For example, as discussed, music assets may contain different channels (e.g., left channel, right channel, center channel, etc.), which would be represented as different asset streams. Audio/visual assets may contain several independent video asset streams, representing a common set of video content coded at different bitrates or, possibly, different sets of video content. Moreover, audio assets or audio/visual assets with speech content may have different assets streams representing the content in different languages (e.g., English, French, Spanish, etc.). Each asset stream typically is partitioned into a plurality of "chunks," that contain a predetermined span of content (e.g., 5 secs., 10 secs.) of the respective asset stream; the chunks each are made available at respective storage locations on the media source. The manifest file may store data identifying the different asset streams that are available for a given asset, parameters of those asset streams, and network locations from which chunks of the various asset streams may be retrieved.

In an aspect, a device 610 having network connectivity may download the manifest file of an asset that it is tasked to play, and it may retrieve chunks of the asset stream that it will play. It may cache the retrieved chunks locally in a cache 615 at the device. In response to a request from a neighbor device (say, 630) for a resource of a media asset (either a manifest file or a chunk), the device 610 also may determine whether it stores the resource locally in its cache. If it does, the device 610 may furnish the resource to the requesting device. If it does not, the device 610 may request the requested resource from the media source.

When the device 610 receives a request for an asset resource from a neighboring device 630, the device 610 may engage in a prefetch operation to download other resources of the asset from the media source in advance of receiving a request for them from the neighbor device 630. The first device 610 may identify from the data record an asset stream to be rendered by the neighbor device 630 and prefetch portions of the asset stream. Doing so may cause the prefetched portions to be available in the device's cache 615 before the neighboring device 630 requests them. The device 610 may discontinue its prefetch operation if requests from the neighboring device 630 cease to be received for a predetermined period of time (which may occur if the neighboring device 630 gains an independent connection to the media source).

In another aspect, even when multiple devices 610, 620 (or all devices) possess independent connections to a media source, a single one of the devices 610 may operate as a download "director" on behalf of other device(s) 620. Selection of which device to operate as the director may be performed based on evaluation of network link quality, availability of bandwidth, or other factors (which may be exchanged in the data record). When a director device 610 is selected, other devices 620 may direct their requests for asset resources from the director device 610 rather than making requests directly from the media source. This implementation is expected to conserve network resources and reduce media source loading in circumstances where multiple devices redundantly render a common asset stream; rather than having multiple devices 610, 620 each download the same content from the media source, one device 610 will retrieve a single copy of the content and forward it to other device(s). In the event that a given download director 610 loses connectivity with a media source or encounters an operation error that prevents it from operating as the director, another device 620 with sufficient connectivity may be designated as the download director, and operation may continue.

FIG. 7 is a block diagram of a rendering device 700 according to an aspect of the present disclosure. The device 700 may include a processor 710, a memory system 720, a network interface 730 and one or more input/output devices 740, all provided in mutual communication with one another.

The processor 710 may execute program instructions representing rendering network control 712 according to the techniques described hereinabove. The memory 720 may store such program instructions for execution by the processor. In an aspect, the memory 720 may be provided as a hierarchical memory system, which may include one or more random access memories and/or long-term storage devices (not shown). Such memories may be provided as electrical-, magnetic- and/or optical-storage media.

The processor 710 also may execute instructions representing other functionality of the rendering network. For a member device that actively renders media content, either by displaying video on a display or outputting audio via a speaker, the processor 720 may execute program instructions for a rendering application. For a rendering device that accepts user commands via spoken input, the processor 710 also may execute a speech-to-text application 716.

The network interface 730 may provide communication with other rendering devices (not shown) and, optionally, with media source devices. The network interface 730 may provide transceivers for transmission and/or reception of data over wireless and/or wireline networks (also not shown).

The input/output devices represent devices to facilitate user interaction with the rendering device 700. Typical input/output devices 740 include displays 742, speakers 744, touch screen devices, and microphones 748. The types of input/output devices 740 provided for a rendering device 700 may vary based on the application for which the rendering device 700 will be used. For example, a rendering device that is provided as a smart speaker may possess a speaker 744 and a microphone 748 but not a display 742 or a touch screen detector 746; the smart speaker may capture audio input and recognize spoken commands by a speech-to-text process 734 executing on the device 700. In another application, the rendering device may be a smart television, which may possess a display 742, speakers 744, a microphone 748 (optionally) and an infrared receiver (not shown); a smart television may accept commands from a remote control (also not shown) through the infrared receiver. And, of course, the rendering device 700 may be provided as a smartphone, which may possess a display 742, speakers 744, a touch screen device, and microphone(s) 748.

The foregoing description has presented aspects of the present disclosure in the context of rendering devices. Typically, such devices are provided as computer-controlled devices such as personal computers, notebook computers, tablet computers, smartphones, computer servers, personal media players, gaming platforms and/or dedicated video-conferencing equipment. Such devices typically operate using computer processors that execute programming instructions stored in a computer memory system, which may include electrical-, magnetic- and/or optical storage media. Alternatively, the foregoing techniques may be performed by dedicated hardware devices such as application specific integrated circuits, digital signal processors and/or field-programmable gate array. And of course, aspects of the present disclosure may be accommodated by hybrid designs that employ both general purpose and/or specific purpose integrated circuit. Such implementation differences are immaterial to the present discussion unless noted hereinabove.

Although the disclosure has been described with reference to several exemplary aspects, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and aspects, the disclosure is not intended to be limited to the particulars disclosed; rather the disclosure extends to all functionally equivalent structures, methods, and uses such as are within the scope of the appended claims.

We claim:

1. A control method for a network of member player devices, comprising:
   receiving at a first device in the network, a data record representing state of the network, the data record comprises: data identifying the devices that are members of the network, grouping(s) of the devices defined for the network, and a desired play state for each of the devices;
   storing the data record at the first device;
   determining, by the first device, whether a play state at the first device is different than a desired play state for the first device as indicated in the data record; and
   if so, altering the play state at the first device to match the desired play state as indicated in the data record.

2. The method of claim 1, further comprising, transmitting the received data record to another device in network.

3. The method of claim 2, wherein the received data record is received from a second device in the network, and the transmitting transmits the data record to all other device(s) in the network to which the first device has direct connectivity except the second device.

4. The method of claim 2, further comprising, when the received data record identifies an originating device at which a change in the data record occurred, identifying the another device to receive the data record via the transmitting step based on an identification of the originating device.

5. The method of claim 1, wherein, when the data record identifies an execution time of a change in the desired play state for the first device, the altering occurs at the execution time.

6. The method of claim 1, wherein, when the data record identifies an execution time of a change in the desired play state for the first device and the execution time has passed, the altering at a future time is computed as an offset between the execution time and the future time.

7. The method of claim 1, wherein the data record contains a change log, storing data of a plurality of changes to desired play state for device(s) in the network.

8. The method of claim 1, wherein the data record identifies a change in the desired play state for the first device, wherein the change is entered by a command at a device different from the first device.

9. The method of claim 1, wherein the data record identifies a change in the desired play state for the first device, wherein the change is defined by a time-triggered command.

10. The method of claim 1, wherein the data record identifies a change in the desired play state for the first device, wherein the change is defined by an event-triggered command.

11. The method of claim 1, further comprising, downloading from a media source a media asset to be played according to the altered play state of the first device.

12. The method of claim 1, further comprising, requesting from another device in the network a media asset to be played according to the altered play state of the first device.

13. The method of claim 1, further comprising, downloading, by the first device from a media source on behalf of a second device in the network, a media asset to be played by the second device, and relaying the downloaded asset to the second device.

14. Non-transitory computer readable medium storing program instructions that, when executed by a processing device in a network of member player devices, cause the processing device to:
   receive at the processing device, a data record representing state of the network, the data record comprises: data identifying the devices that are members of the network, grouping(s) of the devices defined for the network, and a desired play state for each of the devices;
   store the data record at the processing device;
   determine, by the processing device, whether a play state at the processing device is different than a desired play state for the processing device as indicated in the data record; and
   if so, alter the play state at the processing device to match the desired play state as indicated in the data record.

15. The medium of claim 14, wherein the processing device further transmits the received data record to another device in the network.

16. The medium of claim 15, wherein the received data record is received from a second device in the network, and the processing device transmits the data record to all other device(s) in the network to which the processing device has direct connectivity except the second device.

17. The medium of claim 15, further comprising, when the received data record identifies an originating device at which a change in the data record occurred, the processing device identifies the another device to receive the data record via the transmitting step based on an identification of the originating device.

18. The medium of claim 14, wherein, when the data record identifies an execution time of a change in the desired play state, the processing device alters play state at the execution time.

19. The medium of claim 14, wherein, when the data record identifies an execution time of a change in the desired play state and the executing time has passed, the processing device alters play state at a future time computed as an offset between the execution time and the future time.

20. The medium of claim 14, wherein the data record contains a change log, storing data of a plurality of changes in play state of for device(s) in the network.

21. The medium of claim 14, wherein the data record identifies a change in the desired play state for the processing device, wherein the change is entered by a command at a device different from the processing device.

22. The medium of claim 14, wherein the data record identifies a change in the desired play state for the processing device, wherein the change is defined by a time-triggered command.

23. The medium of claim 14, wherein the data record identifies a change in the desired play state for the processing device, wherein the change is defined by an event-triggered command.

24. The medium of claim 14, wherein the processing device downloads from a media source a media asset to be played according to the altered play state of the processing device.

25. The medium of claim 14, wherein the processing device requests from another device in the network a media asset to be played according to the altered play state of the processing device.

26. The medium of claim 14, wherein the processing device:
  downloads from a media source on behalf of a second device in the network a media asset to be played by the second device, and
  relays the downloaded asset to the second device.

27. A device in a network of member player devices, comprising:
  a processor,
  a storage system to store program instructions to be executed by the processor, that cause the device to:
    store a data record representing state of the network, at the device, the data record comprises: data identifying the devices that are members of the network, grouping(s) of the devices defined for the network, and a desired play state for each of the devices;
    determine, by the device, whether a play state at the device is different than a desired play state for the first device as indicated in the data record; and
    if so, alter the play state at the device to match the desired play state as indicated in the data record.

28. The device of claim 27, wherein the device further comprises a transmitter to transmit the received data record to another device in the network.

29. The device of claim 28, wherein the received data record is received from a second device in the network, and the processor causes the transmitter to transmit the data record to all other device(s) in the network to which the processor has direct connectivity except the second device.

30. The device of claim 28, further comprising, when the received data record identifies an originating device at which a change in the data record occurred, the processor identifies the another device to receive the data record via the transmitting step based on an identification of the originating device.

31. The device of claim 27, wherein, when the data record identifies an execution time of a change in the desired play state, the processor alters play state at the execution time.

32. The device of claim 27, wherein, when the data record identifies an execution time of a change in the desired play state and the executing time has passed, the processor alters play state at a future time computed as an offset between the execution time and the future time.

33. The device of claim 27, wherein the data record contains a change log storing data of a plurality of changes in play state for device(s) in the network.

34. The device of claim 27, wherein the device downloads from a media source a media asset to be played according to the altered play state of the device.

35. The device of claim 27, wherein the device requests from another device in the network a media asset to be played according to the altered play state of the device.

36. The device of claim 27, wherein the device:
  downloads from a media source on behalf of a second device in the network a media asset to be played by the second device, and
  relays the downloaded asset to the second device.

37. A control method for a network of member player devices, comprising:
  receiving at a first device in the network, a data record representing state of the network, the data record comprises: data identifying the devices that are members of the network, grouping(s) of the devices defined for the network, and a desired play state for each of the devices;
  storing the data record at the first device;
  determining whether the data record possesses a command, altering a play state of a device; and
  if so and if the command is addressed to the first device, executing the command at the first device.

* * * * *